United States Patent
Kim et al.

(10) Patent No.: US 8,248,963 B2
(45) Date of Patent: Aug. 21, 2012

(54) METHOD ON LOCALIZATION MESSAGE PROCESS FOR SUPPORTING MOBILITY OF WIRELESS NODES

(75) Inventors: Yeon-Soo Kim, Seoul (KR); Hak-Jin Chong, Seoul (KR); Kun-Ho Yi, Seoul (KR)

(73) Assignee: KT Corporation, Seongnam (KR)

( * ) Notice: Subject to any disclaimer, the term of this patent is extended or adjusted under 35 U.S.C. 154(b) by 302 days.

(21) Appl. No.: 12/566,358

(22) Filed: Sep. 24, 2009

(65) Prior Publication Data

US 2010/0074133 A1 Mar. 25, 2010

(30) Foreign Application Priority Data

Sep. 24, 2008 (KR) .................. 10-2008-0093729

(51) Int. Cl.
*H04W 4/00* (2009.01)
*H04W 24/00* (2009.01)
(52) U.S. Cl. ............... 370/252; 370/328; 455/456.3
(58) Field of Classification Search .......... 370/252, 370/310, 328, 338; 455/404.2, 456.3, 456.5, 455/456.6
See application file for complete search history.

(56) References Cited

U.S. PATENT DOCUMENTS

| 7,609,644 B2* | 10/2009 | Tateson | 370/252 |
| 7,970,574 B2* | 6/2011 | Jin | 455/456.1 |
| 2007/0291663 A1* | 12/2007 | Dixit et al. | 370/254 |
| 2011/0128910 A1* | 6/2011 | Moriwaki | 370/328 |

FOREIGN PATENT DOCUMENTS

| KR | 10-2007-0017669 A | 2/2007 |
| KR | 10-2008-0076551 A | 8/2008 |

OTHER PUBLICATIONS

Notice of Preliminary Rejection issued from Korean Intellectual Property Office on Feb. 22, 2010.

* cited by examiner

*Primary Examiner* — Kerri Rose
(74) *Attorney, Agent, or Firm* — Sughrue Mion, PLLC

(57) ABSTRACT

Provided is a method for localization message process. The method includes allocating cluster resources for recognizing a location of a mobile node, setting operation of each node by deciding a cluster operation state for the mobile node, measuring distances between the mobile node to each of anchor nodes, and recognizing a location of the mobile node.

29 Claims, 8 Drawing Sheets

METHOD ON LOCALIZATION MESSAGE PROCESS FOR SUPPORTING MOBILITY OF WIRELESS NODES

BACKGROUND OF THE INVENTION

1. Field of the Invention

The present invention relates to a method on localization message process for supporting the mobility of wireless nodes and a computer readable recording medium for storing the same; and more particularly, to a method on localization message process to quickly measure a location of a mobile node through a sequence of messages and a link control process in a wireless sensor network and a computer readable recording medium storing the same.

2. Description of Related Art

As a wireless communication technology and a micro electronics technology have been advanced, a wireless sensor network has been proposed. The wireless sensor network is a network formed of low price and midget sensors. The wireless sensor network has been used in various application fields such as safety and security, ecology monitor, an intelligent traffic system, the automatic control of manufacturing process, the administration of physical distribution, and disaster relief. Some of sensor devices essentially require location information. These sensor devices may be a sensor device attached to a patient for remotely diagnosing a medical condition of a patient in a hospital, a sensor device attached to a worker in a construction field, or a target node for accomplishing an individual task in a wireless sensor network for managing employees or assets.

A mobile sensor node has unique characteristics, mobility. That is, the mobile sensor node can change its location in an operation environment. Accordingly, it is necessary to measure a location of the mobile sensor node frequently or in real time.

A typical localization method uses an apparatus for measuring location information. A global positioning system (PGS) receiver is one of representative apparatuses for measuring location information. The GPS receiver provides accurate location information. The GPS receiver receives visual information from more than three satellites and calculates a global coordinate of the GPS receiver by measuring a distance based on a time difference of the visual information from more than three satellites. The GPS receiver may measure location information within an allowable error of about 20 m although there is difference according to a receiving environment. The GPS receiver is significantly effective in an outdoor place which is widely open to smoothly receive target satellite signals. However, the GPS receiver is not an effective device to measure location information in an indoor place or for an application service system that requires very high accuracy such as accuracy higher than the allowable error.

Therefore, a wireless sensor network does not use a GPS due to limitation in applicability and low accuracy. On the contrary, the wireless sensor network requires a localization method for finding a location of a mobile node.

The wireless sensor network includes a sink node configured to collect data sensed by each sensor node and transmit the sensed data to a central application server through a transfer network, a cluster head which is a source of cluster configuration, an anchor node configured to provide an origin point of a geometric location in a cluster and to forward a received message to a remote target location, and a mobile node. Except a mobile node, all of sensor nodes in a predetermined area have unique location information. Geometric location information of the sink node, the cluster head, and the anchor node are set manually when the wireless sensor network is established. Or, the location information of the sink node, the cluster head, and the anchor node are automatically or remotely set by a central server. On the contrary, since a mobile node or a target node is attached to a movable object or a person, the mobile node or the target node may have location information changing according to a location thereof.

A location of a mobile node is calculated by measuring distances between each of anchor nodes and a mobile node and estimating a location of the mobile node based on the measured distances. Such a localization of a mobile node may be performed one of a cluster head, a sink node, and an application server according to power efficiency and computation capability of each node. The distance between an anchor node and a mobile node is measured using parameters such as a received signal strength (RSS), a time of arrival (TOA), or a time of flight (TOF), a time difference of arrival (TDOA), and an angle of arrival (ADA). Accordingly, a mobile node measures a distance to each of anchor nodes sequentially. Here, in order to two dimensional (2D) or three dimensional (3D) location information, it is necessary to measure distances from a mobile node to at least three anchor nodes for 2D location information or measure distances from a mobile node to at least four anchor nodes for 3D location information. Such a process also requires a mobile node not to move. Multilateration may be used to measure a distance. Using Multilateration, it is possible to accurately estimate location information of a mobile node.

However, in a predetermined area, a mobile node may move continuously by a person or an animal, a plurality of mobile nodes are present, or a plurality of mobile nodes move at the same time. In these cases, it is difficult to measure a distance from a mobile node to each of anchor nodes because a mobile node travels at a predetermined speed while measuring the distances to the anchor nodes. Therefore, the location of the mobile node may be changed in proportion to a moving speed thereof or because of message retransmission or back off of measurement try, which are generated by collision between measurement messages generated during measuring distances of a plurality of mobile nodes. Such a conventional localization method has disadvantages of difficulties of accurately measuring a distance between nodes in a low speed mobile environment.

Accordingly, there is a demand for developing a method for processing mobile node localization messages in a wireless sensor network for accurately recognizing locations of mobile nodes even when a plurality of mobile nodes move at a predetermined speed and at the same time.

SUMMARY OF THE INVENTION

An embodiment of the present invention is directed to providing a method for localization message process to support the mobility of wireless node and a computer readable recording medium for storing the same An embodiment of the present invention is directed to providing a method for localization message process to quickly measure a location of a mobile node through a sequence of messages and a link control process in a wireless sensor network and a computer readable recording medium storing the same.

An embodiment of the present invention is directed to providing a method for localization message process to support the mobility of wireless node and a computer readable recording medium for storing the same in which single or multiple mobile nodes are allocated with cluster resources to recognize locations thereof by effective link connection control in a multihop sensor network formed of a plurality of clusters, the mobile nodes simultaneously try to measure distances to anchor nodes in corresponding dedicated periods, all of the mobile nodes receive responses sequentially from the anchor nodes at the same time, and the mobile nodes transmit location information (location data) to an application server.

In accordance with an aspect of the present invention, there is provided a method for localization message process, including: allocating cluster resources for recognizing a location of a mobile node; setting operation of each node by deciding a cluster operation state for the mobile node; measuring distances between the mobile node to each of anchor nodes; and recognizing a location of the mobile node.

In accordance with an aspect of the present invention, there is provided a media access control (MAC) super frame structure for supporting localization of single or multiple mobile nodes in a multi-hop sensor network formed of a plurality of clusters, including: a beacon slot period where a beacon frame is transmitted; a first competition access period where each of nodes performs data communication by trying to occupy a channel competitively using a common time hoping sequence; a competition free period where a predetermined node performs exclusive data communication using an unique time hoping sequence; a second competition access period where each of the nodes performs data communication by trying to occupy a channel competitively using a common time hoping sequence; a third competition access period where each of the nodes performs data communication by trying to occupy a channel competitively using a common hoping sequence; and an inactive period where each of the nodes sustains a sleep state.

In accordance with an aspect of the present invention, there is provided a method for localization message process of a cluster head including: at the cluster head, generating and broadcasting a beacon frame in a beacon slot period; at the cluster head, allocating cluster resources to a new mobile node in a first competition access period; at the cluster head, broadcasting cluster state information in the first competition access period by controlling a cluster operation state for all of mobile nodes; at the cluster head, receiving location information or location data from each of corresponding mobile nodes in each competition free period; and at the cluster head, transmitting location information or location data to other nodes in second and third competition access periods.

In accordance with an aspect of the present invention, there is provided a method for localization message process of an anchor node, including: at the anchor node, receiving a beacon frame by inspecting a channel state; at the anchor node, determining whether the received beacon frame is a beacon of an own cluster where the anchor node belongs to; at the anchor node, supporting measuring a distance to each of corresponding mobile nodes in each competition free period by obtaining cluster head resource allocation information and cluster state information and exchanges data in second and third competition access periods if the received beacon frame is a beacon of an own cluster where the anchor node belongs to; and at the anchor node, receiving adjacent cluster state information and exchange data in the third competition access period by confirming a remaining access period of an adjacent cluster if the received beacon frame is not a beacon of an own cluster where the anchor node belongs to.

In accordance with an aspect of the present invention, there is provided a method for localization message process of a mobile node, including: at a mobile node, receiving a beacon frame from a cluster head and determining the received beacon frame is a beacon of an own cluster where the mobile node belongs to; at the mobile node, receiving cluster state information from the cluster head and confirming a time interval if the received beacon frame is a beacon of an own cluster where the mobile node belongs to; at the mobile node, performing cluster connection request and resource allocation, receiving cluster state information from the cluster head, and confirming a time interval if the received beacon frame is a beacon of a new cluster; and at the mobile node, measuring a distance to an anchor node in a competition free period allocated to the mobile node and transmitting location information or location data to the cluster head.

In accordance with an aspect of the present invention, there is provided a computer readable recording medium storing a method for localization message process, the method including: allocating cluster resources for recognizing a location of a mobile node; setting operation of each node by deciding a cluster operation state for the mobile node; measuring distances between the mobile node to each of anchor nodes; and recognizing a location of the mobile node.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 1 is a diagram illustrating a wireless sensor network where the present invention is applied to.

DESCRIPTION OF SPECIFIC EMBODIMENTS

Following description exemplifies only the principles of the present invention. Even if they are not described or illustrated clearly in the present specification, one of ordinary skill in the art can embody the principles of the present invention and invent various apparatuses within the concept and scope of the present invention. The use of the conditional terms and embodiments presented in the present specification are intended only to make the concept of the present invention understood, and they are not limited to the embodiments and conditions mentioned in the specification.

Figure 1:
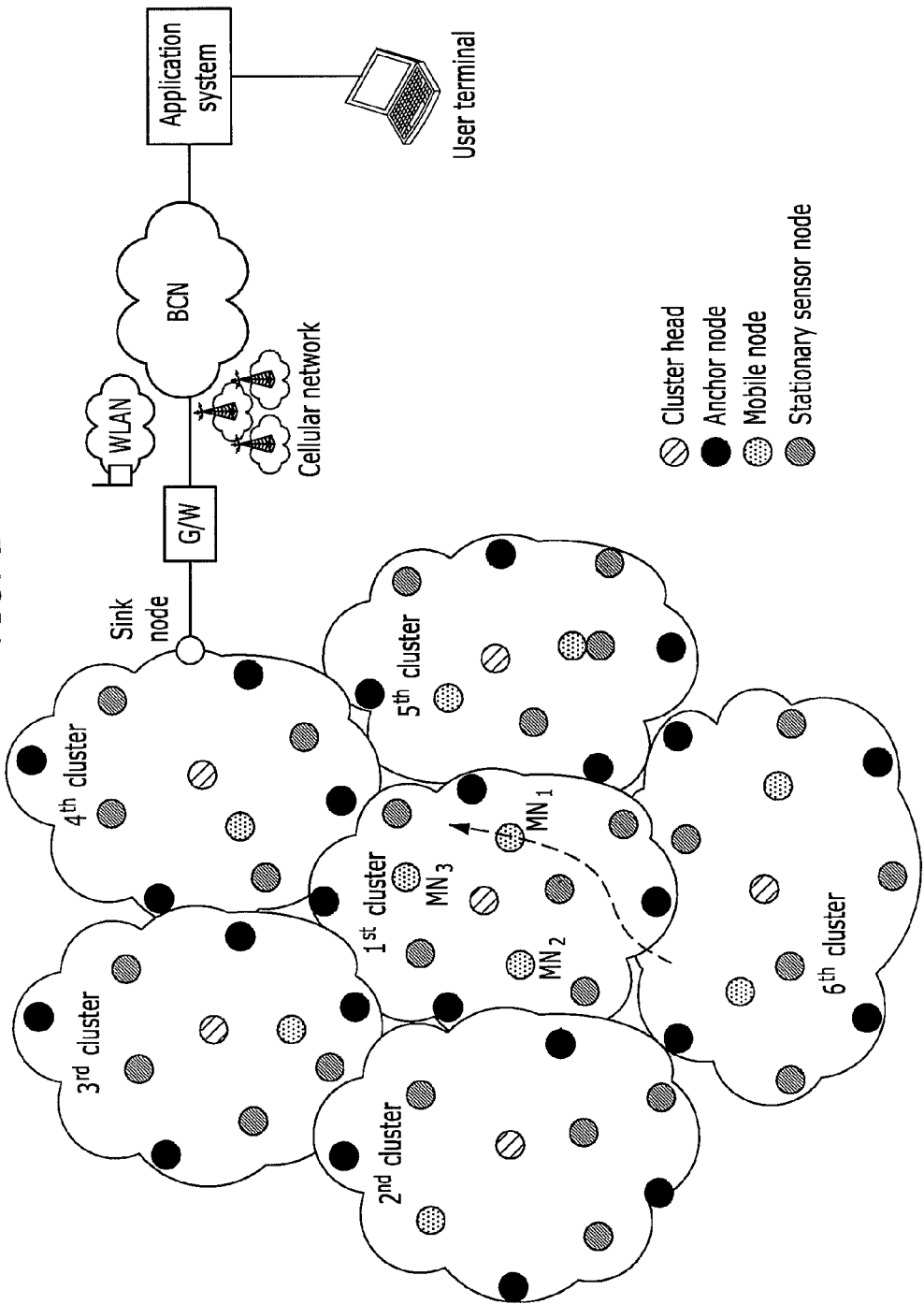

FIG. 1 is a diagram illustrating a wireless sensor network where the present invention is applied to. That is, FIG. 1 shows a typical wireless sensor network for a general application model.

As shown in FIG. 1, a sensor field is a multihop network formed based on a sink node. The sensor field is divided into a plurality of clusters. Each of the clusters includes a cluster head, a plurality of anchor nodes, and a plurality of stationary sensor nodes. The cluster head performs a central role for forming a cluster. The cluster head provides information on a cluster and information on cluster synchronization. The plurality of anchor nodes provides a reference point of a geometric location. The plurality of stationary sensor nodes senses various types of information for application. Here, a mobile node, for example, a mobile sensor node, can freely move in a wireless sensor network space without limitation.

The cluster head, as a center of a cluster network, broadcasts a unique beacon signal, allows or disallows nodes in a cluster to access a network, and allocates network resources such as a node identifier (ID). Further, the cluster head provides current cluster state information to all of mobile nodes in a cluster in consideration of all of connected mobile nodes.

The anchor node has unique geometric location information, supports distance measurement for localization of a mobile node, and transmits data received from all of nodes or adjacent cluster nodes to a target node.

The stationary sensor node senses various types of data for application and transmits sensing data periodically or in response to an inquiry of an application server.

In order to recognize a location, the mobile node measures a distance, performs localization, and transmits location data periodically or in response to the inquiry of an application server.

The application server provides a plurality of application services using location information and sensing data of a mobile node.

The coverage of a cluster head overlaps with a part of adjacent cluster and each of anchor nodes in a cluster receives messages of adjacent cluster heads. Also, a coverage of an anchor node overlaps with a significant area of an adjacent cluster and an area including an adjacent cluster head.

In FIG. 1, a first cluster includes three mobile nodes $MN_1$, $MN_2$, and $MN_3$, and the first mobile node $MN_1$ moves from a sixth cluster to a fourth cluster through a first cluster. Since all cluster heads broadcast a unique beacon signal in a localization message process procedure according to the present embodiment, the first mobile node $MN_1$ receive a beacon signal of the first cluster when the mobile node $MN_1$ enters the first cluster from the fourth cluster and is allocated with resources of the first cluster through accessing the first cluster. Then, a series of distance measurements is performed for localization of the first mobile node $MN_1$. The series of distance measurements are supported by an anchor node based on cluster state information and allocated resources provided from the cluster head. The first mobile node $MN_1$ transmits the collected location data to the cluster head for transmitting it to the application server. The cluster head transmits location data (or calculated location information) to a sink node through adjacent cluster anchor nodes.

Figure 2:
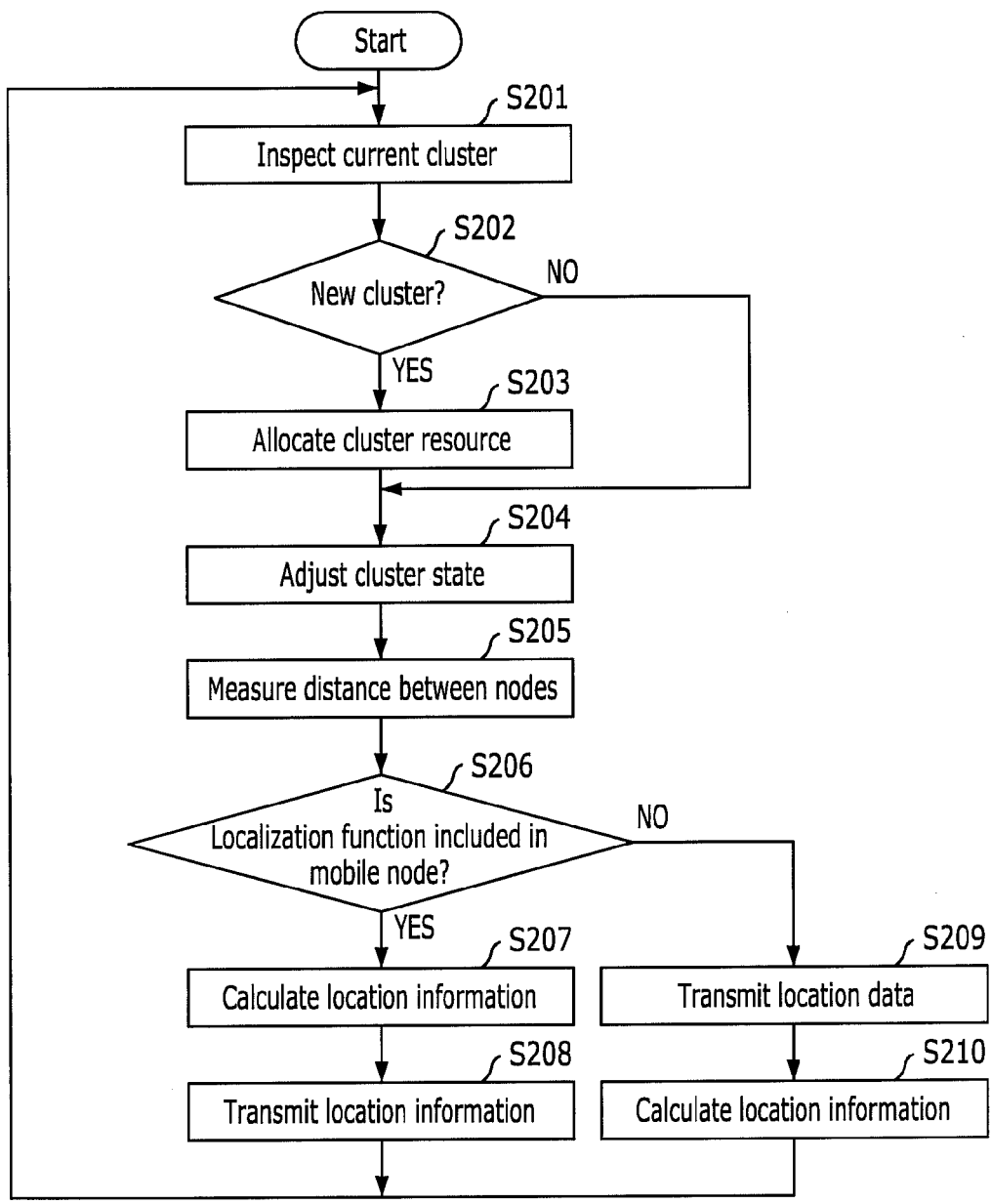
FIG. 2 is a flowchart illustrating a method for localization message process for supporting mobility of a wireless node in accordance with an embodiment of the present invention.

FIG. 2 is a flowchart illustrating a localization messaging method supporting mobility of a wireless node in accordance with an embodiment of the present invention.

The localization messaging method according to the present embodiment includes mutual interaction of $N_{mn}$ mobile nodes, $N_{an}$ anchor nodes, a cluster head, and nodes (cluster head and anchor nodes) of $N_{ACL}$ adjacent cluster nodes.

In the localization messaging method according to the present embodiment, the first process is a cluster resource allocation procedure including steps S201 to S203. The cluster head periodically broadcasts a beacon signal including a cluster ID, a cluster head ID, a beacon interval, an active period, a first competition access period (CAP) and access availability of a mobile node. Accordingly, the mobile node can receive a beacon frame at any locations. The identifier (ID) is provided to identify each cluster and each node. The ID is a 16-bit long short address. The beacon interval is a transmission interval of a cluster beacon frame. The active period is a time period of a corresponding cluster to exclusively occupy a channel. The active period includes a beacon slot. The first competition access period (CAP) is a period that a mobile node accesses a cluster head based on competition. The first CAP is defined as a predetermined period after the beacon slot. Therefore, the cluster resource allocation procedure for a mobile node includes a current cluster inspection step S201 for determining which cluster area a current location is included to based on the received beacon frame information and a cluster access step S203 for allocating cluster resources to the mobile node to participate into a network as a cluster member and to support localization.

At first, the mobile node compares a cluster ID and a $CID_P$ of the received beacon frame with a cluster ID and a $CID_m$ stored in the mobile node at step S201 and determines whether a cluster of a current location is a cluster that the mobile node already accessed or a new cluster at step S202. That is, if the cluster ID and $CID_P$ of the received beacon frame are identical to the cluster ID and the $CID_m$ of the current cluster stored in the mobile node at step S202, it is not necessary to allocate resources to the mobile node. However, the cluster ID and $CID_P$ of the received beacon frame are not identical to the cluster ID and the $CID_m$ of the current cluster stored in the mobile node at step S202, and if it is confirmed through corresponding information of the beacon signal that a cluster head allows a new mobile node to access, the mobile nodes perform the step S203 to be allocated with resources.

In the cluster access step S203, the mobile node transmits a connection request message to the cluster head to request cluster network connection and receives a connection response message from the cluster head. The connection request message includes a cluster ID, a cluster head ID, and a mobility class. The mobility of the mobile node may be classified in consideration of a moving frequency and a mobbing speed because the mobile speed of a mobile node does not generally exceed 10 k/m in a general sensor network. For example, the mobility class of the mobile node is classified into a third class for a stationary mobile node or a nomadic mobile node, a second class for a mobile node traveling at the maximum speed of 4 km/h, and a third class for a mobile node traveling at the maximum speed faster than 4 km/h. The mobility class is used to decide frequency of performing mobile node localization in order to enable all of mobile nodes to receive a service when a corresponding cluster includes more mobile nodes that the cluster can recognize at the same time. That is, the mobility class is used to decide an update rate of location information differently. For example, the mobile node localization is performed once at every beacon interval for the first class, once at every two beacon intervals for the second class, and once at more than four beacon intervals for the third class. Further, the localization of a mobile node may be performed once at a predetermined time interval longer than four beacon intervals.

After receiving the connection request message, the cluster head transmits the connection response message to the mobile node in response to the connection request message.

The connection response message includes a node ID, a time slot number, a time hoping sequence, and an anchor node ID list. The node ID is provided to identify each node. The node ID is a 16-bit short address. The time slot number is a time period that a corresponding mobile node can exclusively use a channel without channel occupying competition such as frame transmission delay or frame collision generated due to back-off in the channel occupying competition. When the time slot number is used with a unique time hoping sequence which is allocated to a mobile node, it is possible to support localization for a plurality of mobile nodes at the same time. The anchor node ID list is a list for assigning a reference location for localization of a mobile node. Accordingly, the mobile node requests all of anchor nodes to measure a distance at the same time and receives a response sequentially from the anchor nodes in the anchor node ID list (see step S205). In the cluster connection step S203, a cluster head and a mobile node can be identified by 48-bit Media Access Control (MAC) address assigned in a device manufacturing procedure. All of anchor nodes receive the connection request message and the connection request message and use the received connection request message and the connection request message to support the distance measurement process for a corresponding mobile node.

In the cluster resource allocation procedure, all of mobile nodes wanting cluster access try cluster access during the first CAP that follows after a beacon slot transmitting a beacons frame. In case of a sensor node supporting a transmission scheme of IR-UWB (Impulse Radio-UltraWide Band), a common time hoping sequence is used. The connection request message is transmitted by applying additional random access mechanism in order to effectively prevent collision generated when a plurality of mobile nodes try connection requests.

Then, a cluster state control step 204 is performed. In the cluster state control step S204, a cluster operation state is set to effectively operate a cluster for mobile nodes already connected to and a mobile node currently connected to. In the cluster state control step S204, following operations are performed. A cluster head decides an effective cluster operation state for all mobile nodes connected thereto. The cluster head transmits cluster state information to all nodes of the cluster for sharing the cluster state information. All of nodes set or updates the received cluster sate information as an operation control value.

The cluster operation state includes assigned time slot change of a mobile node, assigned time slot retrieval of a mobile node, a location information update interval of a mobile node, a time duration of a second competition access period (CAP), and a time duration of a third competition access period (CAP). In order to maximize available cluster network resources while deciding the cluster operation state, the cluster head changes the assigned time slot, retrieves the assigned time slot according to the number of mobile nodes, changes location information update frequency of a corresponding mobile node according to a mobility class of a mobile node, and changes a start time and a time duration of the second CAP and the third CAP.

In case of changing and retrieving the assigned time slots, the retrieval of the assigned time slots means excluding mobile nodes according to predetermined conditions when no more mobile nodes are allowed to access a cluster. Here, the predetermined conditions may be defined as a case of not receiving location information two times, a case of passing a predetermined time from a last time of receiving location information, or a case of receiving a connection release notice representing separation from a current cluster. The assigned time slot is changed when a connected mobile node cannot use an allocated time slot immediately, when a mobile node is additionally allocated with a temporally time slot because the mobile node cannot immediately perform localization at an allocated time slot although the mobile node receives an inquiry for location information from an application server, or when a mobile node is enabled to use the same time slot with other mobile nodes having the same class. It is possible to provide optimal operation state for all of mobile node when the change of allocated time slot is combined with location information update frequency. An initially allocated time slot is changed to other slot in order to enable a mobile node having the same class to use the same time slot.

The changing location information update interval (update frequency) means changing localization intervals of mobile nodes based on capability of connection resources such as maximum capacity of allowing mobile nodes to access, a time hoping sequence, and a time slot number. Here, the localization interval is an interval of measuring a distance to an anchor node. For example, if the number of accessed mobile nodes exceeds the capacity of supporting predetermined class mobile nodes, localization intervals of predetermined mobile nodes are adjusted to be comparatively long. For instance, it is assumed that a cluster head has a support capacity of $N_{ClMAX}$ mobile nodes and a first class mobile node performs localization at every beacon interval. If $N_{exmn}$ more first class mobile nodes are accessed after the support capacity of the cluster head reaches the maximum support capacity, the localization intervals of the $N_{exmn}$ mobile nodes $S_{CClbis}$ are changed to be comparatively longer in order to immediately support localization of newly accessed mobile nodes. After while, if the number of first class mobile nodes becomes less than the maximum support capacity $N_{ClMax}$ of the cluster head, the changed localization intervals of the $N_{exmn}$ mobile nodes $S_{CClbis}$ are returned to the original localization interval. Similarly, the same method of changing location information update interval is applied to the second class or third class mobile nodes.

The second competition access period (CAP) is a period for communication between nodes in a cluster. That is, the second competition access period allows competition based access. The start time of the second competition access period is identical to a start time of a new time slot followed after entire time slots allocated to a mobile node. The time duration of the second CAP is identical to one time slot period.

The third competition access period (CAP) is a period for communication between clusters. The third CAP allows competition based access. The third CAP follows after the second CAP and the time duration thereof is identical to two time slot periods. If an end time of the third CAP does not exceed a maximum active period $T_{MaxActPrd}$ that a cluster head can use, a time duration corresponding to the difference thereof (maximum active period $T_{MaxActPrd}$—the end time of the third CAP) is used as an inactive period for sustaining a sleep state of all nodes.

After the cluster operation state deciding step, a cluster state information sharing step is performed. In the cluster state information sharing step, a message is generated to include the decided cluster state information, and the generated message is broadcasted using a time hoping sequence. Accordingly, the cluster state information is transmitted to all nodes in a cluster. The cluster state information decided in the cluster operation state deciding step is generated as a cluster state information message. The cluster state information message is transmitted not only to mobile nodes and an anchor node but also to nodes of an adjacent cluster at a time of starting a free competition period after the first CAP ends. The cluster state information message also inform starting of a free competition period for localization of a mobile node as well as transmitting cluster state information to all of nodes in a cluster.

After the cluster state information sharing step, a cluster state information updating step is performed. In the cluster state information updating step, an anchor node and a mobile node change or replace existing cluster state information to the received cluster state information. After changing the cluster state information, the anchor node and the mobile node perform operations based on the updated cluster state information.

After the cluster state information update step, a distance measuring step S205 is performed. In the distance measuring step S205, a mobile node measures a distance to each of anchor nodes using an anchor node ID list received in the cluster connection step S203. That is, the mobile node requests all of anchor nodes to measure a distance to the mobile node, receives a response thereof sequentially from the anchor nodes, and calculates the distance to each of the anchor nodes using a well-known method for calculating a distance.

As the well-known method, a two way ranging method for measuring a moving distance of an electric wave is used. Hereinafter, the two way ranging method will be described in detail. At first, a mobile node transmits a ranging request message to all of anchor nodes based on a multicast scheme and receives a ranging response message and a ranging parameter message from each of the anchor nodes as a response thereof. The mobile node receives the ranging response messages and the ranging parameter messages sequentially from corresponding anchor nodes according to the anchor node ID list. The mobile node measures an elapsed time from a time of transmitting a ranging request message to a time of receiving a ranging response message. On the contrary, each of the anchor nodes measures an elapsed time from a time of receiving the ranging request message to a time of transmitting the ranging response message. At the same time, all of the anchor nodes and the mobile node measure frequency draft and clock offset during the elapsed time. Each of the anchor nodes transmits the elapsed time, the frequency draft, and the clock offset (crystal attribute) to the mobile node through the ranging parameter message. Before this, the geometric location information of each anchor node is provided to the mobile node by the ranging response message. Here, the geometric location information may be a coordinate value.

The ranging request message, the ranging response message, and the ranging parameter message are exchanged at a time slot allocated to a corresponding mobile node. Here, at a time slot formed of $N_{SubSlot}$ sub-slots, the mobile node transmits the ranging request message to each of the anchor nodes through a first sub-slot. The $N_{anchor}$ anchor nodes transmit the ranging response message and the ranging parameter message to the corresponding mobile node through a second sub-slot to a $(N_{anchor}+1)^{th}$ sub-slot. That is, when four anchor nodes ($_{Nanchor}=4$) are included, the first anchor node uses a second sub-slot, the second anchor node uses a third sub-slot, and the fourth anchor node uses a fifth sub-slot to transmit the ranging response message and the ranging parameter message to a corresponding mobile node.

When a plurality of mobile nodes are allocated with the same time slot, corresponding mobile nodes perform the distance measurement step S205 at the same time. Since each of the plurality of mobile nodes is allocated with a unique time hopping sequence, each of the mobile nodes can communicate without interruption during the distance measuring step S205. When the plurality of mobile nodes perform the distance measuring step at the same time, each of the anchor nodes transmits crystal attribute to the plurality of mobile nodes using a common time hopping sequence. That is, location coordinate of an anchor node is loaded in the ranging response message and transmitted to the plurality of mobile nodes using a multicasting scheme. The crystal attribute and the measuring result are loaded into the ranging parameter message and transmitted to the plurality of mobile nodes using a multicasting scheme.

Then, the mobile node obtains $N_{anchor}$ distance measuring results by calculating a propagation time between each of the anchor nodes and the mobile node, that is, a physical distance, based on the received measurement value and a value measured itself using a well-known calculation method. Hereinafter, all data related to localization such as the obtained distance measuring results and the received location information of each anchor node are referred to as location data.

When all of $N_{anchor}$ distance measuring results are obtained at step S205, a mobile node location data processing procedure including steps S206 to S210 is performed. The mobile node location data processing procedure includes calculating mobile node location information using the location data according to a location of a function for estimating a location of a mobile node and transmitting the calculated mobile node location information to a cluster head, a sink node, or an application server at steps S207 and S208 and calculating mobile node location information at a corresponding node by transmitting the location data to a cluster head, a sink node, or an application server at steps S209 and S210.

Here, in the mobile node location information calculating step S207 or S210, the mobile node location information may be calculated by applying a well-known Multilaterlation with the obtained $N_{anchor}$ distance measuring results and the location information of a corresponding anchor node. According to available resources of a device such as energy amount and computation capability, a mobile node may calculate the mobile node location information at step S207 or the cluster head, the sink node, or the application server may calculate the mobile node location information at the step S210. That is, when the mobile node includes a mobile node location estimating function, the mobile node calculates own location information using the location data, creates a location data message with the calculated mobile node location information, and transmits the created location data message to the cluster head. When the cluster head, the sink node, or the application server includes a mobile node location estimating function, the mobile node creates a location data message with the location data and transmits the created location data message to the cluster head.

The location information transmitting procedure includes a first step for transmitting the calculated mobile node location information or the location data to the cluster head and a second step for transmitting the calculated mobile node location information or the location data to the sink node or the application server by passing adjacent cluster nodes from the cluster head through multihop routing. In the first step, a mobile node transmits own location information or location data to a cluster head through exchanging a location data message transmitted by the mobile node and an Ack message transmitted from the cluster head. The location data message includes a cluster head ID, a mobile node ID, a location coordinate of a mobile node, a time stamp, and an order number. If the mobile node does not include the location estimating function, the location data message includes a cluster ID, a mobile node ID, an anchor node coordinate set, an anchor node-mobile node distance measuring result set, a time stamp, and an order number. The exchanging of the location data message and the Ack message is performed through the last sub-slot of a time slot allocated to a corresponding mobile node. The allocated time slot is exclusively used for data communication between the corresponding mobile node and the cluster head. Therefore, it is possible to transmit the message immediately.

In the second step, the cluster head transmits the location data to the sink node or the application server by passing adjacent cluster nodes through multi-hop routing using the third competition access period. Intermediate nodes between the cluster head and the sink node include a routing table to transmit a received location data message from the mobile node and forward the received location data message in a direction to the sink node through data communication using the routing table during the third CAP. If many intermediate nodes are included on a path to the sink node, several third CAPs may be continuously used to transmit the location data message to the sink node. In such a second step, the location data is transmitted based on a common time hoping sequence. Therefore, the third CAP supports a slotted CSMA/CA (Carrier Sense Multiple Access with Collision Avoidance) scheme for occupying a transmission channel of nodes.

As described above, the method for localization message process according to the present embodiment is performed in an order of messages defined between a mobile node, an anchor node, and a cluster head. That is, the method for localization message process according to an embodiment of the present invention includes a beacon frame broadcasting procedure, a message processing procedure for accessing cluster, a cluster state information broadcasting procedure, a mobile node distance measuring result messaging procedure, and a location data transmitting message processing procedure. Those procedures will be described with reference to FIG. 3.

Figure 3:
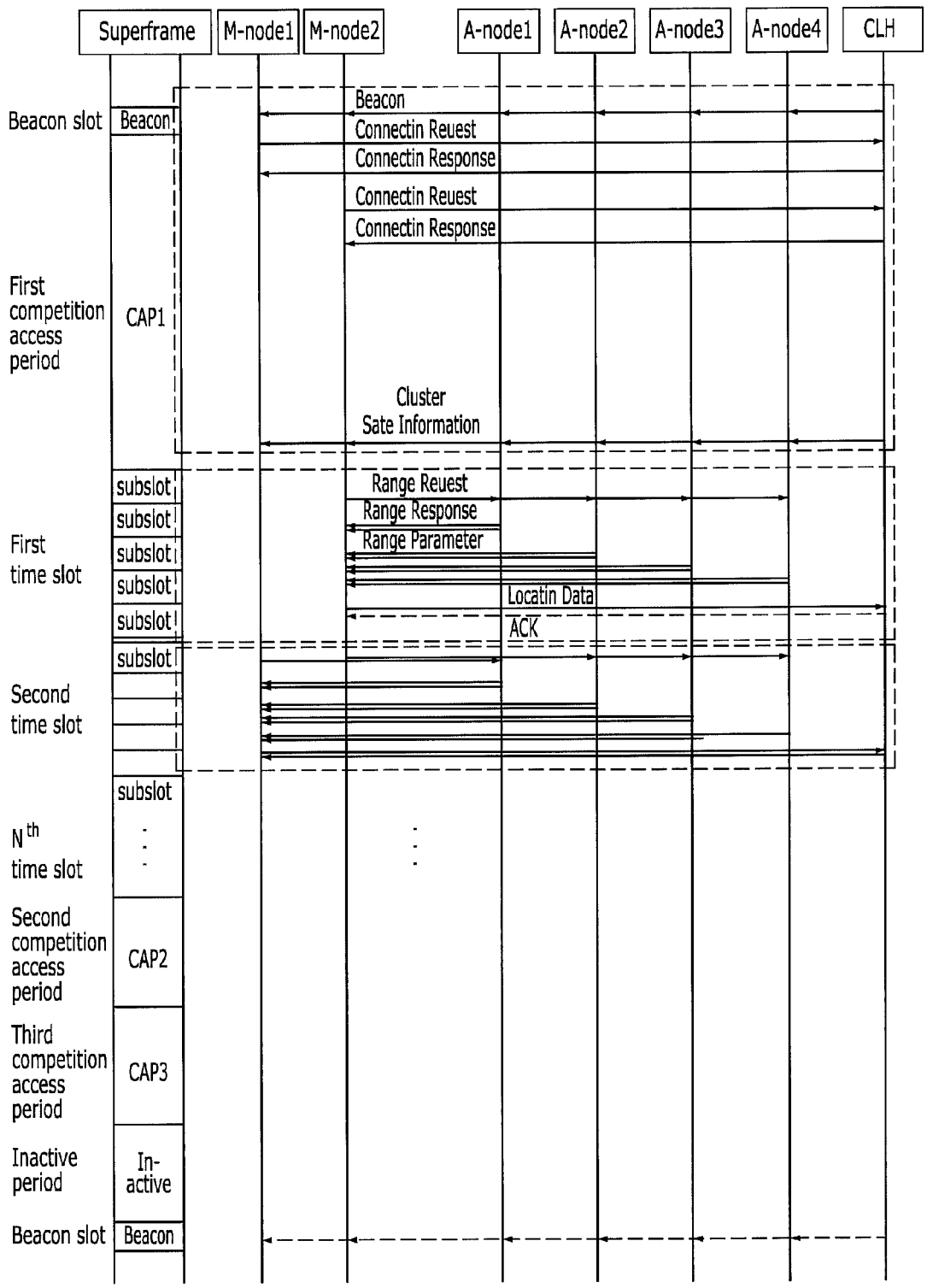
FIG. 3 is a diagram illustrating a method for localization message process in accordance with an embodiment of the present invention.

FIG. 3 is a diagram illustrating a method for localization message process in accordance with an embodiment of the present invention. As shown, FIG. 3 illustrates the localization message processing among two mobile nodes, four anchor nodes, and a cluster head.

At first, in a beacon frame broadcasting procedure, a cluster head broadcasts a beacon frame to all of nodes in a cluster. In FIG. 3, the cluster head broadcasts the beacon frame to a first mobile node, a second mobile node, and first to fourth anchor nodes.

Then, in a cluster connection message processing procedure, a mobile node transmits a connection request message to a cluster head and the cluster head transmits a connection response message to the mobile node as a response. The connection request message and the connection response message are also transmitted to all of anchor nodes in a cluster. The anchor nodes confirm information (mobile node ID, a time slot, and a time hoping sequence) of the connected mobile node through the cluster connection message processing procedure. The anchor nodes use corresponding mobile node information to support distance measurement of corresponding mobile node. In FIG. 3, a first mobile node connects to a cluster according to the cluster connection message processing procedure and then a second mobile node connects to a cluster according to the cluster connection message processing procedure.

Then, in a cluster state information broadcasting procedure, a cluster head transmits cluster state information to all of nodes in a cluster. In FIG. 3, the cluster head transmits the broadcasted cluster state information message to a first mobile node, a second mobile node, and anchor nodes K (K=1, 2, 3, and 4).

Then, in a mobile node distance measuring procedure, the mobile node and the anchor nodes exchange a ranging request message, a ranging response message and a ranging parameter message as the response of the ranging request message. When a mobile node transmits the ranging request message to all of anchor nodes, each of the anchor nodes transmits a ranging response message and a ranging parameter message to a corresponding mobile node as a response of the ranging request message in an order of an anchor node ID list. In FIG. 3, the second mobile node transmits a ranging request message to all of anchor nodes using a multicast scheme according to the mobile node distance measuring message procedure. Then, the first anchor node transmits a ranging response message and a ranging parameter message to the second mobile node as a response of the ranging request message at first. Then, sequentially, the second anchor node, the third anchor node, and the fourth anchor node transmit the ranging response message and the ranging parameter message to the second mobile node as the response of the ranging request message.

Then, in a location information transfer message processing procedure, a mobile node transmits a location data message to a cluster head and the cluster head transmits an Ack message to the mobile node as a response. The location information transfer message processing procedure is performed by a mobile node at a sub-slot of a time slot allocated to a mobile node.

As described above, the method for localization message process of FIG. 3 requires supporting a MAC super frame. That is, the MAC super frame (see FIG. 4) may improve efficiency of the method for localization message process.

Figure 4:
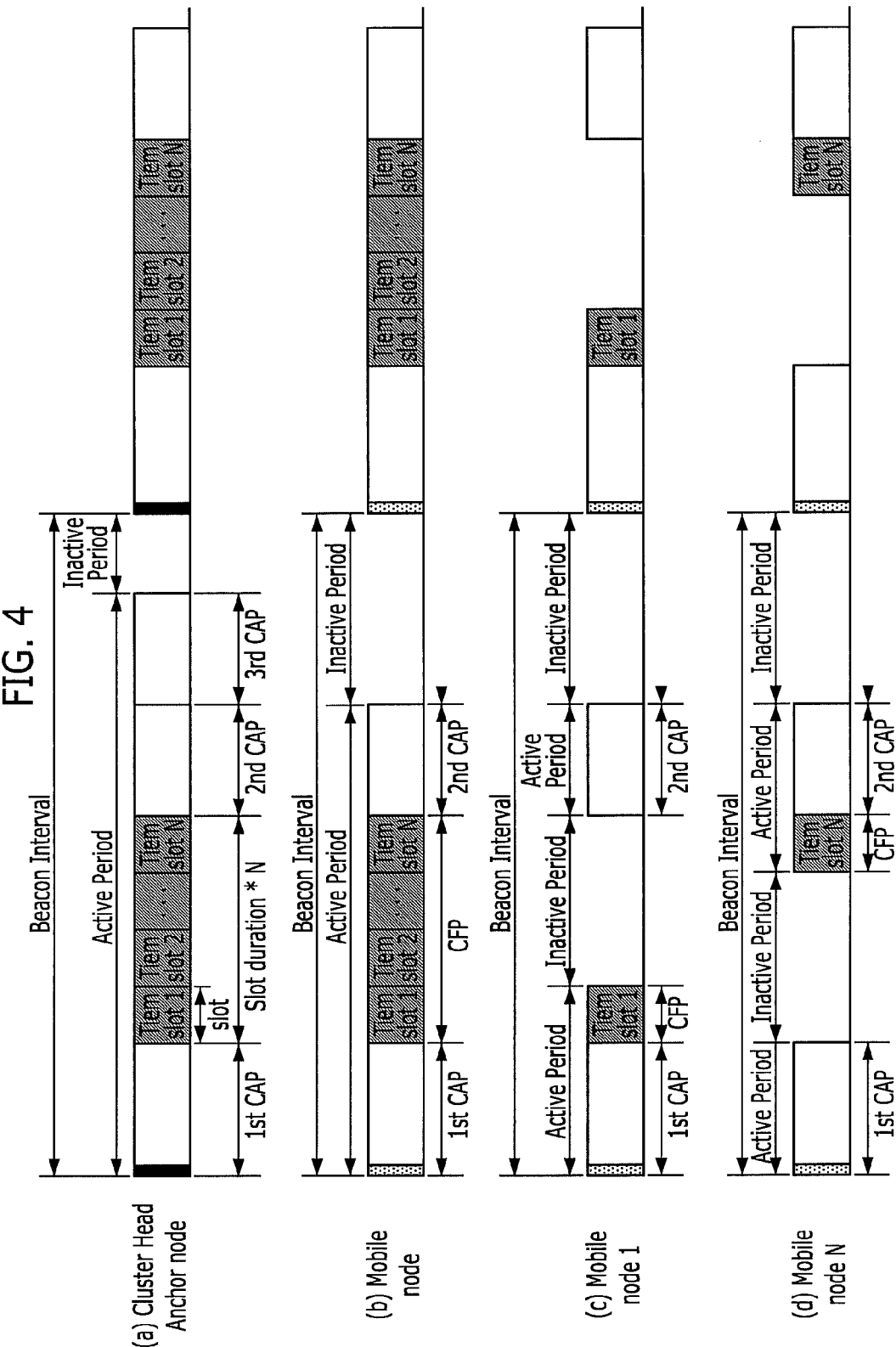
FIG. 4 is a diagram illustrating a MAC super frame structure of each node in accordance with an embodiment of the present invention.

FIG. 4 is a diagram illustrating a MAC super frame structure of each node in accordance with an embodiment of the present invention.

A basic structure of the MAC super frame includes an active period where a beacon slot starts and an inactive period. The active period includes a beacon slot period for transmitting a beacon frame, a first competition access period in which each of nodes competes to each others to occupy a channel using a common time hoping sequence and exchanges data with each others, a free competition period in which predetermined nodes can exclusively transmit data using unique time hoping sequence, a second competition access period in which each of nodes competes with each others to occupy a channel using a common time hoping sequence and exchanges data with other nodes, a third competition access period in which each of nodes competes with each others to occupy a channel using a common time hoping sequence and exchanges data with other nodes using the same method of the second competition access period.

The first CAP is formed of $N_{1CAPSub}$ sub-slots and each of the sub-slots is formed of $N_{1CAPMini}$ mini slots. In the first CAP, a mobile node accesses a cluster and a resource is allocated to the mobile node through data communication between the mobile node and the cluster head. At the same time, the connection and resource allocation information is transmitted to all of the anchor nodes. For data communication in the first CAP, the mobile node performs back-off value selection and channel occupying try at each of sub-slots. For example, the mobile node selects a back-off value from a back-off window [0,2] and inspects a channel state at a mini-slot selected from the first sub-slot for trying occupying a channel. Here, the back-off value is the number of mini-slots to wait for trying occupying a channel and a mini-slot number is defined by adding one to the number of mini-slots. If a channel is not occupied or in an idle state after inspecting the channel state, the mobile node immediately transmits a message for example, a connection request message. However, if the channel is in a busy state, the mobile node performs the same procedure at the second sub-slot.

Meanwhile, a super frame of each node has a slightly different structure according to a function of each node. At first, a super frame structure for a cluster head and an anchor node is identical to the basic structure as described above. As shown in (a) of FIG. 4, the super frame includes a beacon slot period, a first competition access period in which mobile nodes access a cluster, a second competition access period in which all of nodes in a cluster perform data communication with a cluster head, a second competition access period in which all of nodes in a cluster perform data communication with a cluster head, a third competition access period in which a cluster head and an anchor node perform data communication with adjacent clusters, and a competition free period formed of the maximum $N_{STMax}$ time slots. The competition free period can support maximally $N_{STMax}$ mobile nodes when a mobile node identifier sequence is not used. Further, the competition free period can support maximally $N_{STMax}*N_{THSMax}$ mobile nodes when a mobile node uses identifier sequence like a time hopping sequence. Here, $N_{THSMax}$ denotes the maximum number of time hopping sequences which is a method of identifier of a mobile node in a physical layer.

A diagram (b) of FIG. 4 shows a super frame structure for entire mobile nodes. As shown, the super frame structure includes a beacon slot period, two competition access periods including a first competition access period, a second competition access period, and a free competition period formed of maximum $N_{STMax}$ time slots. Each of the mobile nodes includes a time slot exclusively allocated to each of the mobile nodes. It means that it is not necessary for a mobile node to perform any operation in other time slots except a time slot exclusively allocated to the mobile node itself. Accordingly, the mobile node can sustain an inactivation state in other time slots. Thus, it is possible to improve energy efficiency of the mobile node.

A diagram (c) of FIG. 4 shows a super frame structure of a first mobile node. That is, the diagram (c) of FIG. 4 shows a super frame structure when a first time slot is allocated to the first mobile node. Therefore, the diagram (c) of FIG. 4 shows a structure identical to the super frame structure of the diagram (b) of FIG. 4 except a second time slot to an $N^{th}$ time slot. The second time slot to the $N^{th}$ time slot are replaced with an inactivation state in the super frame structure of the diagram (c) of FIG. 4. Similarly, a super frame structure can be defined for N mobile nodes allocated with a time slot N as shown in a diagram (d) of FIG. 4.

For a multiple cluster environment, it is necessary to allocate different active periods for adjacent clusters in order to avoid interference between clusters.

Figure 5:
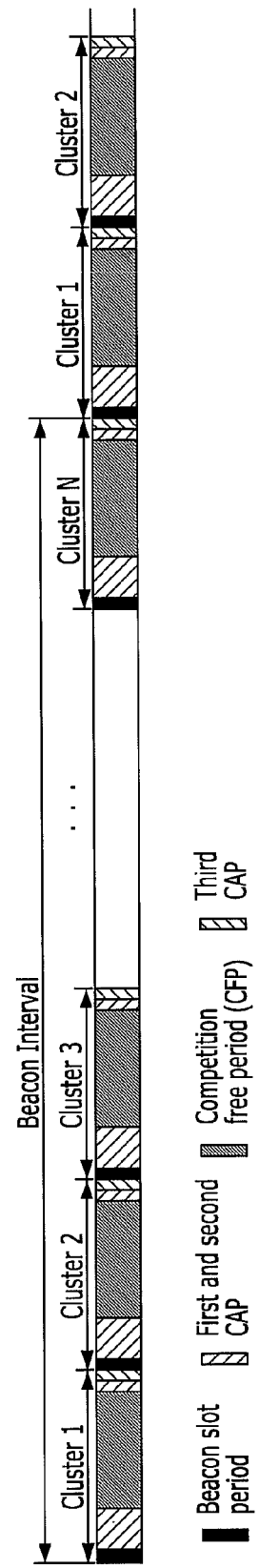
FIG. 5 is a diagram illustrating a super frame structure of each cluster in multi cluster environment in accordance with an embodiment of the present invention.

FIG. 5 is a diagram illustrating a super frame structure of each cluster in multi cluster environment in accordance with an embodiment of the present invention. That is, FIG. 5 illustrates allocation for active period of a cluster.

FIG. 5 exemplary illustrates allocation of active periods of a second cluster to an $N^{th}$ cluster using an inactive period of a first cluster for a convenient description. Here, each cluster active period includes a beacon slot period, first and second competition access periods, a competition free period, and a third competition access period. Operation of each node according to an embodiment of the present invention is formed based on the localization message processing procedure and a MAC super frame structure.

Figure 6:
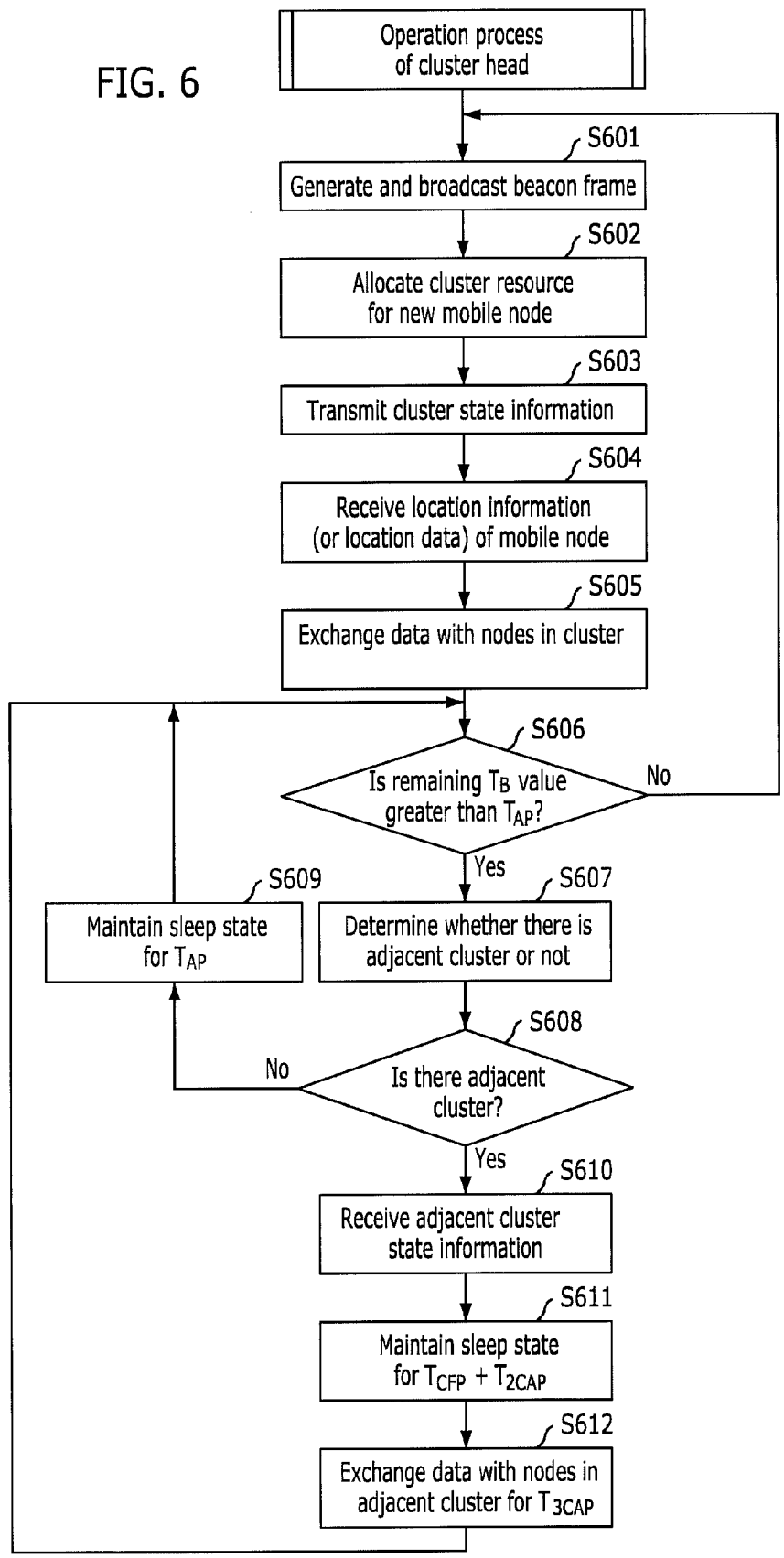
FIG. 6 is a flowchart illustrating a method for localization message process in a cluster head in accordance with an embodiment of the present invention.

FIG. 6 is a flowchart illustrating a method for localization message process in a cluster head in accordance with an embodiment of the present invention.

At first, a cluster head generates a beacon frame and broadcasts the generated beacon frame to a cluster coverage in a beacon slot period of a super frame start time at step S601.

At step S602, the cluster head receives a connection request message in the first competition access period followed by the beacon slot period and allocates cluster resources to a new mobile node by transmitting a connection response message as a response of the connection request message. Such a cluster resource allocation procedure is performed for all of new mobile nodes.

At step S603, the cluster head generates cluster state information through adjusting a cluster operation state for a new mobile node and an existing mobile node and broadcasts the generated cluster state information to all nodes in a cluster.

Then, the cluster head receives location information (or location data) of a corresponding mobile node from each of mobile nodes in each of a competition free period at step S604. That is, the cluster head receives location information (or location data) at a time slot allocated to a corresponding mobile node.

Then, the cluster head performs data communication with nodes in a cluster in a second competition connection period at step S605.

Then, other operations are performed according to an inactive period or an active period of an adjacent cluster.

If a remaining time (TB) of a timer (Ts) is smaller than a maximum cluster active period (TAP) at step S606, a cluster head regards no adjacent cluster and waits a beacon slot period for a next beacon frame. Here, an initial setup value of the timer Ts corresponds to a beacon period of the cluster head itself.

If the remaining time of the timer Ts is greater than the maximum cluster active period at step S606, it determines whether there is an adjacent cluster or not at step S607. Here, in order to determine, a cluster beacon is received for a predetermined time. That is, if the frame received for the predetermined time is a beacon frame and if a corresponding received beacon frame is a valid frame, it determines that there is an adjacent cluster.

If any frames including a beacon frame are not received for the predetermined time, it determines that there is no adjacent cluster at step S608. Then, a sleep state is sustained for the cluster active period at step S609 and a remaining time is confirmed by performing the step S606.

If it determines that there is an adjacent cluster at step S608, state information of an adjacent cluster corresponding to a received beacon at step S610.

Then, it confirms a competition free period $T_{CFP}$, second competition access period $T_{2CAP}$, a third competition access period $T_{3CFP}$ of a corresponding adjacent cluster. At step S611, a sleep state is sustained for $(T_{CFP}+T_{2CAP})$. At step S612, the cluster head exchanges data with adjacent cluster nodes during a $T_{3CFP}$. After the $T_{3CFP}$ ends, the remaining time of the timer TS is confirmed by performing the step S606.

According to the remaining time, the cluster head repeats transmitting and receiving data with the newly searched adjacent cluster nodes. Therefore, the cluster head transmits received location information (location data) of a mobile node to the sink node or an application server by passing an adjacent cluster node through a routing scheme in the T3CFP period.

Figure 7:
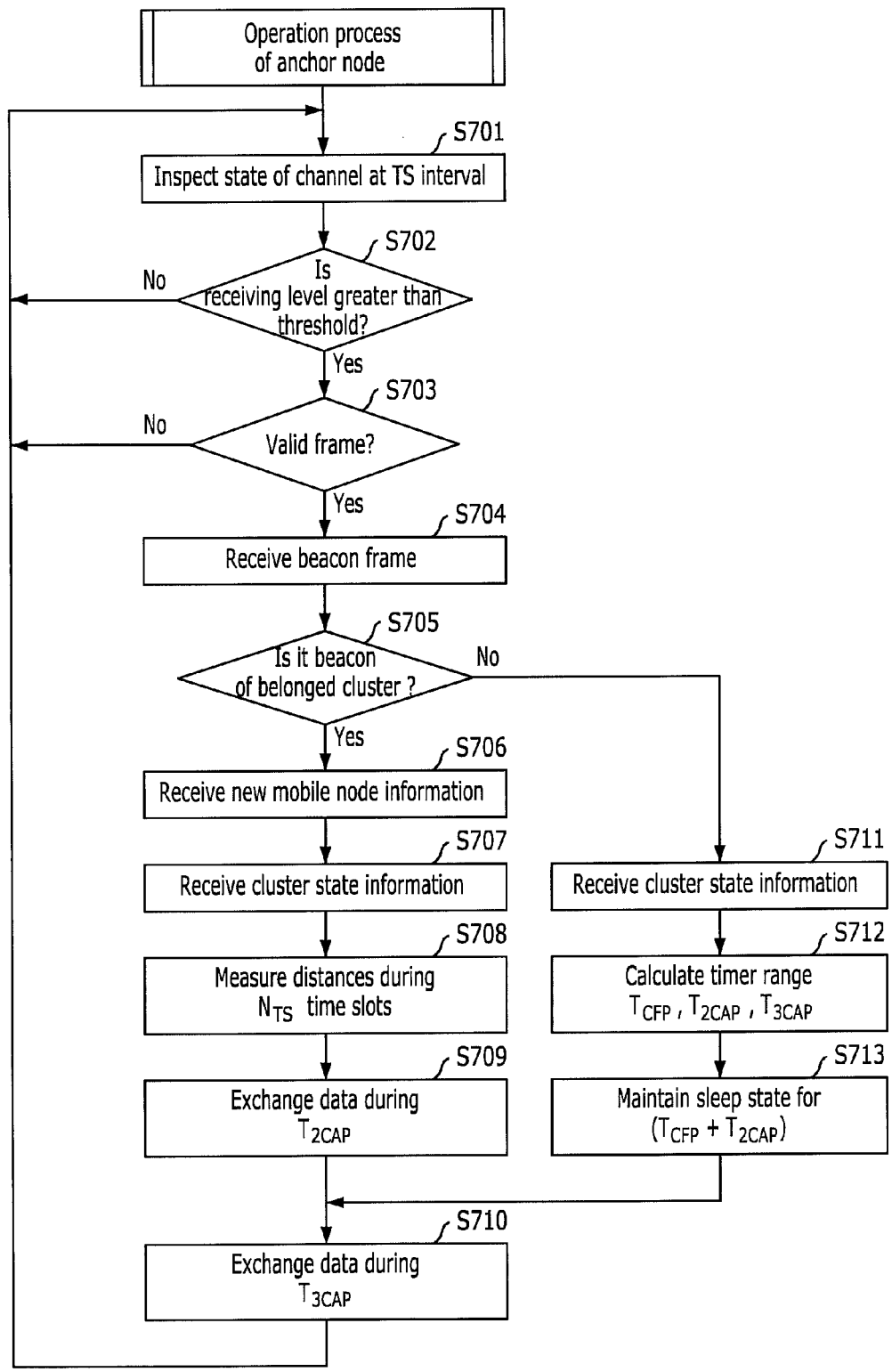
FIG. 7 is a flowchart illustrating a method for localization message process in an anchor node in accordance with an embodiment of the present invention.

FIG. 7 is a flowchart illustrating a method for localization message process in an anchor node in accordance with an embodiment of the present invention.

An anchor node is initially synchronized with a cluster head based on a receiving time of a beacon frame. The anchor node can receive a beacon frame of a cluster head at a beacon slot time. The operation of the anchor node starts with receiving a beacon frame according to a super frame structure.

At first, the anchor node inspects a channel state at a predetermined time interval, for example, a time slot (TS) interval at step S701. The anchor node determines whether a receiving level is higher than a threshold at step S702. The anchor node determines whether the receiving level higher than the threshold is a valid frame or not at step S703. If the receiving level higher than the threshold is valid, the anchor node receives a beacon frame at step S704. If the receiving level is not higher than the threshold or if the receiving level higher than the threshold is not valid, the step S701 is performed.

At step S705, the anchor node determines whether a received beacon frame is a beacon frame of an own cluster where the anchor node is included by comparing a cluster ID of the received beacon frame with a cluster ID of the own cluster.

If the anchor node determines that the cluster ID, $ID_{aCLH}$ of the received beacon frame is an ID of the own cluster, the anchor node obtains information about resources allocated to a new mobile node accessing a cluster head by receiving a connection response message in a first competition access period at step S706. The information about the allocated resources includes a mobile node ID, a time hopping sequence, an allocated time slot, and an anchor node ID list.

Then, the anchor node obtains cluster state information by receiving a cluster state information message transmitted from a cluster head at step S707.

Then, the anchor node measures a distance to a mobile node at each of $N_{TS}$ time slots which are a competition free period at step S708.

Then, the anchor node exchanges data such as managing information and sensing data with all of nodes in a cluster fur the second competition access period $T_{2CAP}$ at step S709.

The anchor node exchanges data with a cluster head and an adjacent cluster node to transmit mobile node location information (or mobile node location data) transmitted from a cluster head to a sink node or an application server for the third competition access period $T_{3CAP}$ at step S710.

If the anchor node determines a cluster ID, $ID_{aCLH}$ of the received beacon frame is not an ID of an own cluster, the anchor node receives state information of a correspond cluster IDaCLH, which is an adjacent cluster, at step S711. The anchor node calculates and confirms a time range such as a remaining access period of a corresponding cluster IDaCLH, that is, a competition free period TCFP, a second competition access period T2CAP, and a third competition access period T3CAP at step S712. These calculated values are applied as a related time value for supporting operation of an anchor node.

The anchor node sustains a sleep state for a time duration of $(T_{CFP}+T_{2CAP})$ which is a time direction for data communication between the anchor node and nodes in an adjacent cluster at step S713.

When the third competition access period of an adjacent cluster starts, the anchor node participates data exchange for a time of $T_{3CAP}$ in order to communicate with clusters such as transmission of the mobile node location information (or mobile node location data) at step S710.

After the time of $T_{3CAP}$ ends, the anchor node repeatedly performs the localization messaging procedure based on a beacon period of a super frame and an arranged time.

Figure 8:
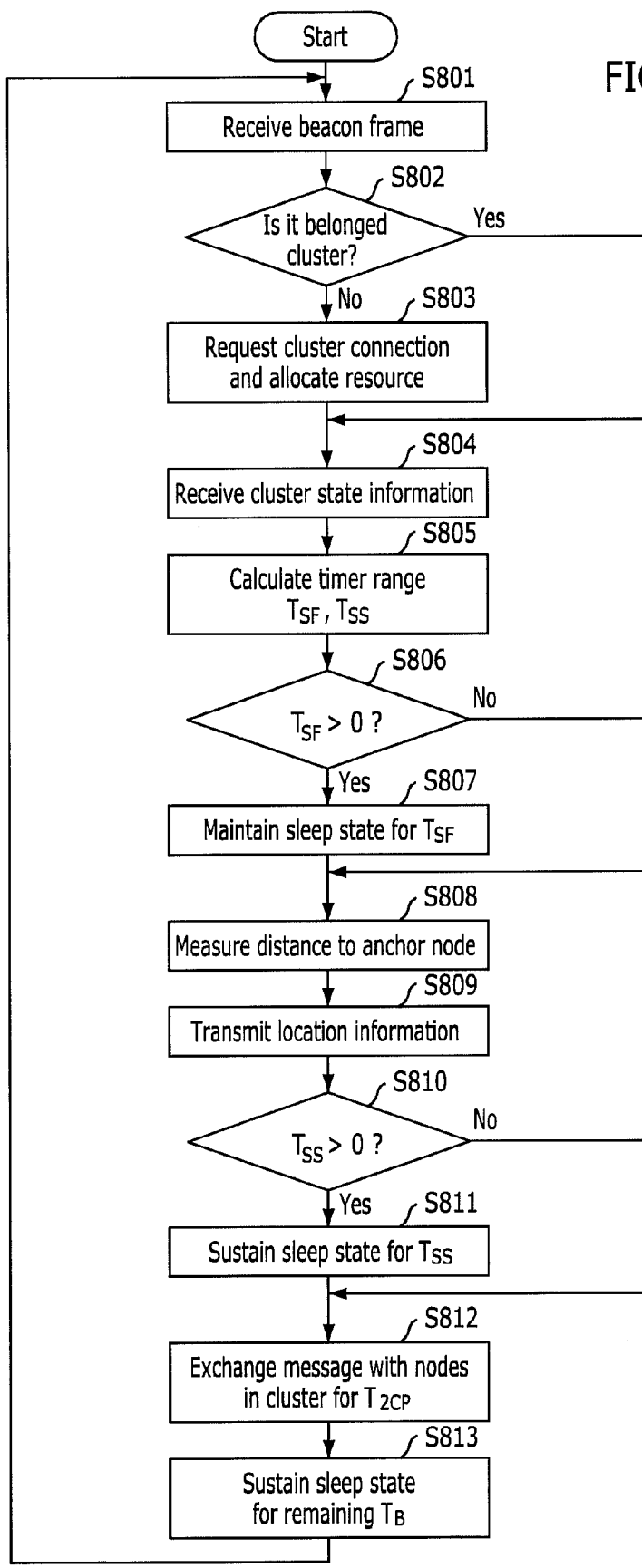
FIG. 8 is a flowchart illustrating a method for localization message process in a mobile node in accordance with an embodiment of the present invention.

FIG. 8 is a flowchart illustrating a method for localization message process in a mobile node in accordance with an embodiment of the present invention.

Like the anchor node, a mobile node is initially synchronized with a cluster head based on a time of receiving a beacon frame. Therefore, the mobile node can receive a beacon frame of a cluster head at a beacon slot time. The operation of the mobile node starts operation when the mobile node receives a beacon frame according to a super frame structure. If the mobile node is not accessed to any cluster, that is, when the mobile node initially operates, the mobile node has only own clock because the mobile node cannot know any cluster information. Therefore, the mobile node continuously inspects a channel for receiving a beacon frame.

At first, the mobile node receives a beacon frame from a cluster head at step S801 and determines whether the received beacon frame is a beacon frame of an own cluster that the mobile node is included in or not based on a cluster ID included in the received beacon frame at step S802.

If the received beacon frame is a beacon frame of the own cluster that the mobile node is included in, the step S804 is performed. If not, that is, in case of entering to a new cluster, the mobile node performs a cluster connection request and resource allocation procedure at step S803. Here, in the cluster connection request, the mobile node occupies a wireless channel according to a predetermined medium access method and transmits a connection request message to the cluster head to request cluster connection. In the cluster resource allocation, the cluster head transmits a connection response message to the mobile node as a response to the cluster connection request in order to allocate a node ID, time hopping sequence, and a time slot.

At step S804, the mobile node receives cluster state information from a cluster head. That is, the mobile node can obtain cluster state information by receiving a cluster state information message broadcasted from a cluster head at a time of ending a first competition access period.

The mobile node calculates a time interval $T_{SF}$ from a current time to a start time of an allocated time slot and a time interval $T_{SS}$ from an end time of an allocated time slot to an end time of a competition free access period based on the received cluster state information at step S805. These values are used as setup values of a timer supporting operation of a mobile node.

At first, a process is performed according to a time interval $T_{SF}$ from a current time to a start time of an allocated time slot. If $T_{SF}$ is larger than 0, that is, if the allocated time slot is not the first at step S806, the mobile node sustains a sleep state for energy effective operation for $T_{SF}$ at step S807 and the mobile node measures a distance to an anchor node at step S808. That is, when the mobile node sequentially receives parameters related to a distance to all of anchor nodes and collects all of distance measuring values through calculating distance data, the mobile node calculates location information using own location data, and transmits the calculated location information or the own location data to the cluster head at step S809. Such location information transmitting step is performed in a time slot period allocated to the mobile node itself.

A process is performed according to the time interval $T_{SS}$ value from the allocated time slot end time to the competition free access period end time. If the $T_{SS}$ value is greater than 0, that is, the allocated time slot is not the last at step S810, the mobile node sustains a sleep state for remaining competition free period for energy effective operation at step S811. Then, the step S812 is performed. However, if the TSS is 0, that is, the last time slot is allocated at step S810, a following period is the second competition access period. Therefore, the mobile node performs data communication, for example, exchanging necessary message with nodes in the cluster for $T_{2CAP}$ at step S812.

When the second competition access period ends, the mobile node sustains a sleep state for a remaining time of a beacon time $T_B$ for energy effective operation at step S813. When the beacon timer ends, the mobile node wakes up from the sleep state to an activation state to receive a new beacon signal.

The mobile node repeats the method of localization message process according to the super frame structure.

As described above, the method for localization message process according to the present embodiment can measure a distance to each of anchor nodes although a mobile node continuously moves in a predetermined area, although a plurality of mobile nodes are present, or although a plurality of mobile nodes move at the same time. Further, the method for localization message process according to the present embodiment can accurately recognize a location of a mobile node even in a moving environment having a predetermined moving speed or in an environment with a plurality of mobile nodes because message retransmission or back-off is not generated although collision is occurred during distance measurements of a plurality of mobile nodes are simultaneously performed.

The above described method according to the present invention can be embodied as a program and stored on a computer readable recording medium. The computer readable recording medium is any data storage device that can store data which can be thereafter read by the computer system. The computer readable recording medium includes a read-only memory (ROM), a random-access memory (RAM), a CD-ROM, a floppy disk, a hard disk and an optical magnetic disk.

The present application contains subject matter related to Korean Patent Application No. 2008-0093729, filed in the Korean Intellectual Property Office on Sep. 24, 2008, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. A method for localization message process, comprising:
allocating cluster resources for recognizing a location of a mobile node;
setting operation of each node by deciding a cluster operation state for the mobile node;
measuring distances between the mobile node to each of anchor nodes; and
recognizing a location of the mobile node,
wherein said allocating cluster resources includes:
at a cluster head, broadcasting a beacon frame;
at the mobile node, confirming a current cluster area using information of the broadcasted beacon frame;
at the mobile node, connecting to the cluster head based on competition; and
at the cluster head, allocating cluster resources to support localization of the mobile node.

2. The method of claim 1, wherein said setting operation of each node includes:
at a cluster head, deciding a cluster operation state for all of connected mobile nodes;
at the cluster head, transmitting cluster state information to each of nodes in a corresponding cluster for sharing the cluster state information; and
at each of the nodes in the corresponding cluster, receiving the cluster state information and setting and updating the received cluster state information as a control condition for operation.

3. The method of claim 2, wherein in said deciding a cluster operation state, the cluster head changes and retrieves an assigned time slot according to the number of the mobile nodes, changes a location information update frequency of the mobile node according to a mobility class of the mobile node, and changes time information about a second competition access period (CAP) and a third competition access period (CAP).

4. The method of claim 2, wherein in said transmitting cluster state information, the cluster head transmits cluster state information to each node in the corresponding cluster and adjacent cluster nodes for sharing the cluster state information.

5. The method of claim 4, wherein in said transmitting cluster state information, the cluster head generates the decided cluster state information in the said deciding cluster state information as a cluster state information message and broadcasts the generated cluster state information message.

6. The method of claim 1, wherein said measuring distances includes:
at the mobile node, requesting each of the anchor nodes to measure a distance at the same time;
receiving distance measuring data sequentially from each of the anchors; and
measuring distances from the mobile node to each of the anchor nodes using the received distance measuring data.

7. The method of claim 6, wherein in said requesting each of the anchor nodes, the mobile node transmits a ranging request message to each of the anchor nodes in a corresponding cluster using a multicast scheme.

8. The method of claim 6, wherein in said receiving distance measuring data, the mobile node receives a ranging response message and a ranging parameter message according to an order of an anchor node ID list from each of the anchor nodes.

9. The method of claim 6, wherein said measuring a distance is performed in an exclusive time slot period allocated to the mobile node.

10. The method of claim 6, wherein in said requesting each of the anchor nodes, in case of multiple mobile nodes, each of the multiple mobile nodes requests to each of the anchor nodes to measure a distance using unique time hoping sequence allocated to each of the mobile nodes itself.

11. The method of claim 6, wherein in said receiving distance measuring data, each of mobile nodes receives a ranging response message and a ranging parameter provided by an anchor node using a common time hopping sequence.

12. The method of claim 11, wherein the anchor node uses a multicasting scheme to transmit the ranging response message and the ranging parameter message to each of the mobile nodes.

13. The method of claim 6, wherein in said recognizing a location, the mobile node calculates location information using location data including the measured distance and location information of the anchor node.

14. The method of claim 6, wherein in said recognizing a location of the mobile node, the mobile node calculates location information using location data including the measured distance and location information of the anchor node and transmits the calculated location information to a upward node.

15. The method of claim 6, wherein in said recognizing a location of the mobile node, the mobile node transmitting the measured distance and the location information of the anchor node to an upward node to calculate location information.

16. The method of claim 6, wherein the mobile node includes:
   a beacon slot period where a beacon frame is transmitted;
   a first competition access period where each of nodes performs data communication by trying to occupy a channel competitively using a common hoping sequence;
   a competition free period where the mobile node performs exclusive data communication using a unique time hoping sequence for localization of the mobile node;
   a second competition access period where each of nodes performs data communication by trying to occupy a channel competitively using a common hoping sequence; and
   an inactive period where each of the nodes sustains a sleep state.

17. The method of claim 1, wherein the beacon frame broadcasted by the cluster head includes a cluster ID, a cluster head ID, a beacon interval, an active period, a first competition access period (CAP), and information about whether mobile nodes are allowed to access or not.

18. The method of claim 1, wherein in said connecting to the cluster head, the mobile node requests connection by transmitting a connection request message to the cluster head, wherein the connection request message includes a cluster ID, a cluster head ID, and a mobility class.

19. The method of claim 18, wherein in said connecting to the cluster head, channel occupying try is performed for competition based connection by a back-off value selected in every sub-slot of a competition access period.

20. The method of claim 1, wherein in said allocating cluster resources, the cluster head transmits a connection response message to the mobile node and all of anchor nodes in a corresponding cluster, wherein the connection response message includes a node ID, a time slot number, a time hopping sequence, and an anchor node ID list.

21. The method of claim 1, wherein the cluster head and the anchor node have a super frame structure, and the super frame structure includes:
   a beacon slot period for transmitting a beacon frame;
   a first competition access period for data communication by trying to occupy a channel competitively using a common time hopping sequence by each of nodes;
   a competition free period where a predetermined node perform exclusive data communication using unique time hopping sequence;
   a second competition access period where each of the nodes tries to occupy a channel competitively using a common time hoping sequence;
   a third competition access period where each of the nodes try to occupy a channel competitively using a common time hoping sequence; and
   an inactive period where each of the nodes sustains a sleep state.

22. The method of claim 21, wherein the first competition access period is formed of a plurality of sub-slots, and each of the sub-slots is formed of a plurality of mini-slots.

23. The method of claim 21, wherein the competition free period is formed of a plurality of time slots, and each of the time slots is formed of a plurality of sub-slots.

24. A media access control (MAC) super frame structure for supporting localization of single or multiple mobile nodes in a multi-hop sensor network formed of a plurality of clusters, comprising:
   a beacon slot period where a beacon frame is transmitted;
   a first competition access period where each of nodes performs data communication by trying to occupy a channel competitively using a common time hoping sequence;
   a competition free period where a predetermined node performs exclusive data communication using a unique time hoping sequence;
   a second competition access period where each of the nodes performs data communication by trying to occupy a channel competitively using a common time hoping sequence;
   a third competition access period where each of the nodes performs data communication by trying to occupy a channel competitively using a common hoping sequence; and
   an inactive period where each of the nodes sustains a sleep state.

25. The method of claim 24, wherein the first competition access period is formed of a plurality of sub-slots and each of the sub-slots is formed of a plurality of mini-slots.

26. The method of claim 24, wherein the competition free period is formed of a plurality of time slots, and each of the time slots is formed of a plurality of sub-slots.

27. A method for localization message process of a cluster head, comprising:
   at the cluster head, generating and broadcasting a beacon frame in a beacon slot period;
   at the cluster head, allocating cluster resources to a new mobile node in a first competition access period;
   at the cluster head, broadcasting cluster state information in the first competition access period by controlling a cluster operation state for all of mobile nodes;
   at the cluster head, receiving location information or location data from each of corresponding mobile nodes in each competition free period; and
   at the cluster head, transmitting location information or location data to other nodes in second and third competition access periods.

28. A method for localization message process of an anchor node, comprising:
   at the anchor node, receiving a beacon frame by inspecting a channel state;
   at the anchor node, determining whether the received beacon frame is a beacon of an own cluster where the anchor node belongs to;
   at the anchor node, supporting measuring a distance to each of corresponding mobile nodes in each competition free period by obtaining cluster head resource allocation information and cluster state information and exchanges data in second and third competition access periods if the received beacon frame is a beacon of an own cluster where the anchor node belongs to; and
   at the anchor node, receiving adjacent cluster state information and exchange data in the third competition access period by confirming a remaining access period of an adjacent cluster if the received beacon frame is not a beacon of an own cluster where the anchor node belongs to.

29. A method for localization message process of a mobile node, comprising:

at a mobile node, receiving a beacon frame from a cluster head and determining the received beacon frame is a beacon of an own cluster where the mobile node belongs to;

at the mobile node, receiving cluster state information from the cluster head and confirming a time interval if the received beacon frame is a beacon of an own cluster where the mobile node belongs to;

at the mobile node, performing cluster connection request and resource allocation, receiving cluster state information from the cluster head, and confirming a time interval if the received beacon frame is a beacon of a new cluster; and at the mobile node, measuring a distance to an anchor node in a competition free period allocated to the mobile node and transmitting location information or location data to the cluster head.

* * * * *